United States Patent
Reynoso et al.

[11] Patent Number: 5,280,828
[45] Date of Patent: Jan. 25, 1994

[54] SPEED GOVERNOR FOR ROTATIONAL DRIVE

[75] Inventors: Frank Reynoso, Long Beach, Calif.;
T. Scott Engle, Tualatin, Oreg.;
Gabriel Marason, Jr., El Monte;
Frederic A. Schwager, Manhattan Beach, both of Calif.

[73] Assignee: Mattel, Inc., El Segundo, Calif.

[21] Appl. No.: 832,268

[22] Filed: Feb. 7, 1992

[51] Int. Cl.5 .................................. F16D 43/16
[52] U.S. Cl. ........................ 188/184; 192/103 C; 192/105 CD
[58] Field of Search ............ 188/184, 189, 180, 82.1, 188/82.7, 82.84, 185, 186; 192/103 C, 103 B, 105 CD; 73/535-537, 540; 74/3

[56] References Cited

U.S. PATENT DOCUMENTS

| | | |
|---|---|---|
| 2,513,798 | 7/1950 | Hatfield . |
| 2,808,905 | 10/1957 | Bohl . |
| 3,035,665 | 5/1962 | Gauley . |
| 3,044,347 | 7/1962 | MacMillin ............... 188/184 X |
| 3,080,020 | 3/1963 | Hershey . |
| 3,223,208 | 12/1965 | Ryan et al. . |
| 3,245,688 | 4/1966 | Ryan . |
| 3,283,867 | 11/1966 | Rice ....................... 192/105 CD |
| 3,645,363 | 2/1972 | Fuths . |
| 3,687,254 | 8/1972 | Bystrom ................ 192/103 B X |
| 3,763,969 | 10/1973 | Summerfield . |
| 3,779,355 | 12/1973 | Okuno . |
| 4,015,696 | 4/1977 | Lichti . |
| 4,158,307 | 6/1979 | Schwager . |
| 4,195,721 | 4/1980 | Shea ......................... 188/184 X |
| 4,448,284 | 5/1984 | Ciabo ....................... 188/184 X |
| 4,572,333 | 2/1986 | Westley . |
| 4,757,786 | 7/1988 | Ellegard ................ 192/103 B X |
| 5,086,657 | 2/1992 | Wang et al. ............ 192/103 B X |

FOREIGN PATENT DOCUMENTS

| | | | |
|---|---|---|---|
| 2707445 | 8/1978 | Fed. Rep. of Germany ...... 188/184 |
| 522227 | 7/1920 | France ............................. 188/184 |
| 604643 | 9/1925 | France ............................. 188/184 |
| 0154817 | 6/1990 | Japan ............................. 192/103 B |
| 96838 | 9/1939 | Sweden ........................... 188/184 |

OTHER PUBLICATIONS

P. 174 from *Machine Design*, Apr. 14, 1960 (vol. 32, No. 8).

*Primary Examiner*—Douglas C. Butler
*Attorney, Agent, or Firm*—Roy A. Ekstrand

[57] ABSTRACT

A speed governor is enclosed within a generally cylindrical housing which defines an interior cylindrical surface. A rotor is rotatably supported within the enclosure of the housing and is coupled to a power coupling belt by a pulley formed in the rotor shaft. A pair of weighted arms are pivotally secured to the rotor forming a pair of centrifugal counterweights. A coil spring is commonly coupled between the counterweights to provide a drawing force urging the counterweights to a collapsed inward position. Each counterweight supports a friction pad on its outer surface facing the cylindrical surface of the governor housing.

7 Claims, 2 Drawing Sheets

SPEED GOVERNOR FOR ROTATIONAL DRIVE

FIELD OF THE INVENTION

This invention relates generally to speed governors and particularly to those used in rotational drive systems.

BACKGROUND OF THE INVENTION

Many rotating drive systems employ a speed governor or speed control device to maintain a relatively constant rotational speed. The object of such speed governors is to compensate for variations of drive power such as those caused in electrical motor drive systems due to battery fluctuations or those used in spring wound motor drive systems which tend to be relatively inconsistent.

The need for speed governors in rotational systems has prompted practitioners in the art to create and provide a variety of rotational speed governors. Perhaps one of the most successful and pervasive types of speed governor structure utilizes a rotationally supported rotor usually operating within a fixed drum or housing A plurality of weights are pivotally supported upon the rotor in a manner which causes them to pivot and extend outwardly in response to centrifugal forces caused by rotor rotation. In most speed governors, a weight return or counterforce spring is coupled to the pivotally supported weights in a manner urging the weights inwardly upon the rotor in opposition to the outward force caused by centrifugal force. The interior surface of the stationary drum is usually adapted to provide a frictional force against the counterweights as they extend outwardly in response to centrifugal forces as the rotors turns. As the rotors turns faster, the centrifugal force overcomes the return spring force and pivots the weights outwardly. The resisting spring force is chosen such that the centrifugal force at the maximum desired rotational speed is sufficient to force the outer surfaces of the counterweights against the interior surface of the stationary drum thereby producing a resisting force which controls the rotor speed. In the event speed decreases, a correspondingly reduced centrifugal force is applied to the counterweights which permits the return spring force to draw the weights inwardly.

U.S. Pat. No. 4,158,307 issued to Schwager sets forth a GOVERNOR ROTOR ASSEMBLY having a one-piece rotor which includes a base portion generally perpendicular to the axis of rotation. A pair of diametrically opposed tangentially extending U-shaped recesses are formed in the base member to receive a pair of counterweights in a pivotal attachment. A pair of torsion springs are coupled to a each of the counterweights to provide a restoring force urging the counterweights to pivot inwardly. The outer surfaces of the counterweights support a frictional material. The entire rotor assembly is received within a drum housing which provides an interior cylindrical surface which the outer surfaces of the counterweights contact as the weights move outwardly under the urging of centrifugal force.

U.S. Pat. No. 2,808,905 issued to Bohl sets forth a SPEED GOVERNOR in which a cylindrical drum housing receives and supports a rotor having a generally planar base portion. A pair of pivotally secured counterweights are supported upon the base portion and define outer break surfaces adapted to frictionally engage the interior drum surface of the housing. The pivotal attachment of the counterweights is intermediate the inner and outer ends thereof and a return spring is coupled between the outwardly extending end portions of the counterweights. A spacing member is supported upon the base portion between the inwardly extending ends of the counterweights to provide a spacing limit therebetween.

U.S. Pat. No. 3,763,969 issued to Summerfield sets forth a SIMPLIFIED GOVERNOR in which a pull string motor driven sound producing device includes a speed governor having a shaft rotatably mounted within a housing and a weight pivotally mounted upon the shaft such that the ends of the weight are capable of moving outwardly against the housing to slow the shaft rotation. A leaf spring biases the weight inwardly out of engagement.

U.S. Pat. No. 2,513,798 issued to Hatfield sets forth a CENTRIFUGAL CLUTCH in which a drive pulley is coupled to a source of rotational power. The pulley is rotatable within a driven pulley and includes an elongated curved clutch member which is interposed between the drive pulley and the driven pulley. A combination of an eccentric weight and coupling spring controls the gripping force of the clutch in response to centrifugal forces.

U.S. Pat. No. 3,080,020 issued to Hershey sets forth a CENTRIFUGAL GOVERNOR in which a rotating shaft is coupled to a first portion having a pair of diametrically opposed outwardly extending lobes. A movable member is coupled to the lobe portion and a pair of centrifugal weights are pivotally supported on either side of the movable member. The angular displacement between the movable member and the lobed portion is controlled by the weight position which in turn is responsive to centrifugal force during shaft rotation.

U.S. Pat. No. 3,035,665 issued to Gauley sets forth a DECELERATION RESPONSIVE BRAKE having a rotatably member, a stationary member and a plurality of engaging elements pivotally mounted on the rotational member. The engaging elements are disposed with their centers of gravity between the pivotal mounting means thereof and the center of rotation of the rotatable member. Rotation of the engaging elements about the pivotal mounting axis causes the engaging elements to frictionally engage the stationary member.

U.S. Pat. No. 3,223,208 issued to Ryan, et al. sets forth a GOVERNOR having a rotatable mounted rotor and two weights rotatably mounted thereon. Between the weights, an interlocking means for equalizing the forces exerted thereon and spring means for biasing the weights inwardly is provided. The rotating member moves within a cylindrical drum having a cylindrical interior surface against which the weights engage.

U.S. Pat. No. 3,245,688 issued to Ryan sets forth a SPEAKING DOLL WITH PHONOGRAPH DEVICE THEREFOR having a phonograph device supporting a rotatable record and drive mechanism therefor. A speed governor is coupled to the rotatable drive mechanism and includes a rotor having a pair of pivotally supported counterweights which extend outwardly during rotation and engage braking surfaces to control rotational speed.

U.S. Pat. No. 3,645,363 issued to Fuths sets forth a SPEED REGULATING DEVICE in which a rotating shaft includes a base member supporting a pair of pivotally supported counterweights. The rotor and counterweights are rotatably supported within a drum member having an interior brake surface which is engaged by the counterweight at high rotation speeds.

U.S. Pat. No. 3,779,355 issued to Okuno sets forth an CENTRIFUGAL CLUTCH in which a pair of brackets are mounted on opposite ends of a clutch boss and each formed with guide projections and saddle-like arcuate shoes which in turn support friction lining material. The arcuate members are rotated outwardly in response to centrifugal force to provide frictional of a surrounding drum surface.

U.S. Pat. No. 4,015,696 issued to Lichti sets forth a CENTRIFUGAL BRAKING DEVICE having a centrifugal body pivotally connected to a sprocket and movable from a rest position to a stop position to provide breaking movement of a rotary shaft in response to rotary speed or speed changes of the shaft.

U.S. Pat. No. 4,572,333 issued to Westley sets forth a SPEED GOVERNING AND DECOUPLING DRIVE MECHANISM intended for use with a stepper motor. The mechanism includes a pinion assembly in the drive train which is rotatably coupled to the rotor by dogs on the assembly which engage spokes in a rotor in the motor when the assembly is in a first position along the axis of the rotor. The pinion assembly also includes weighted shoe which move outwardly when the assembly rotates at a speed beyond a predetermined speed to frictionally engage an internal drum surface and control rotational speed.

While the foregoing described prior art devices have provided workable speed governors for many applications, they are often expensive to fabricate and complex to assemble. Accordingly, there remains a need in the art for evermore improved speed governors which operate effectively and which are relatively inexpensive to manufacture and easy to assemble.

SUMMARY OF THE INVENTION

Accordingly, it is a general object of the present invention to provide an improved speed governor. It is a more particular object of the present invention to provide an improved speed governor which uses relatively few parts in a simple assembly and which may be easily fabricated.

In accordance with the present invention, there is provided a rotational speed governor comprises: a housing defining an interior cavity having a cylindrical interior surface; a rotor defining an axis of rotation rotatably supported within the interior cavity; a pair of counterweights each having a first end pivotally secured to the rotor, a second end and an outwardly facing friction surface therebetween; and a spring defining an elongation axis having first and second ends, the spring being coupled to between the second ends of the pair of counterweights such that the elongation axis of the spring extends through the axis of rotation of the rotor.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
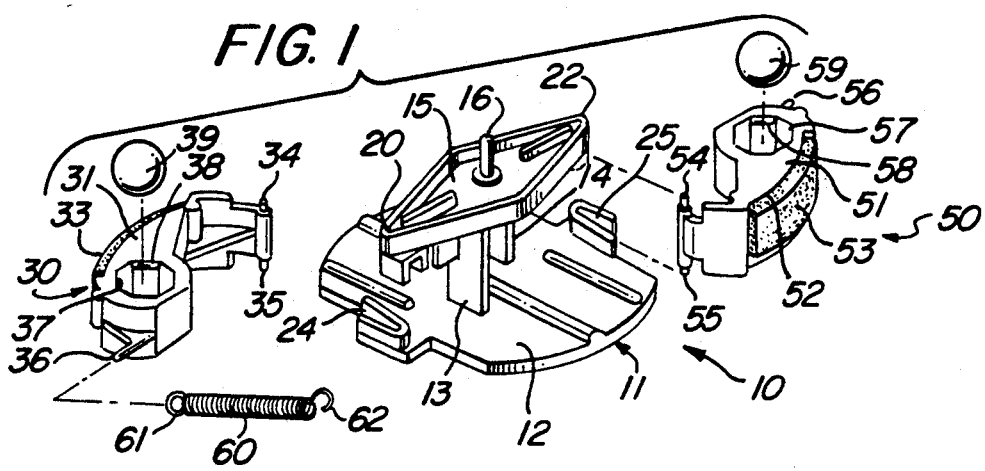
FIG. 1 sets forth a perspective assembly view of the present invention speed governor.

FIG. 1 sets forth a perspective assembly view of the rotor and counterweight assembly of the present invention speed governor generally referenced by numeral 10. Governor 10 includes a rotor 11 having a generally planar baseplate 12 defining a pair of upwardly extending spaced apart supports 13 and 14. An elongated generally diamond-shaped upper beam 15 is secured to and supported by supports 13 and 14 in a generally parallel relationship to baseplate 12. Upper beam 15 defines an end portion 22 having an open-sided slot recess (better seen in FIG. 3). Similarly, upper beam 15 defines an end portion 20 having an open-sided slot recess 21 defined therein. Baseplate 12 further defines an open-ended slot recess 25 generally aligned with recess 23 and extending in the opposite direction thereof. Similarly, baseplate 12 defines an open-sided slot recess 24 generally aligned with recess 21 and extending in the opposite direction thereto. Upper beam 15 defines an upper shaft 16 which terminates in a rounded end portion. As is better seen in FIG. 2, rotor 11 further includes a plurality of support webs 42 through 44 and a downwardly extending lower shaft 17. Lower shaft 17 further supports a pulley 40 defining a pulley groove 41 therein.

Returning to FIG. 1, governor 10 further includes a pair of identical weights 30 and 50. Counterweight 30 includes a generally curved arm 31 defining a curved outer surface 32. Surface 32 supports a friction pad 33 thereon. Curved arm 31 defines a pair of oppositely extending pivots pins 34 and 35 at one end and an outwardly extending spring tab 36 at the remaining end. Curved arm 31 further defines a hexagonal passage 37 having a plurality of inwardly extending ribs such as rib 38 defined therein. A spherical weight ball 39, preferably formed of a relatively heavy material such as steel or the like, is received within hexagonal passage 37 in a force-fitted attachment in which ball 39 is captivated within hexagonal passage 37.

Counterweight 50, as mentioned, is identical to counterweight 30 and thus defines a curved arm 51 having a curved outer surface 52 supporting a friction pad 53. Arm 51 further includes a pair of pivot pins 54 and 55 at one end and a spring tab 56 at the other end. A hexagonal recess 57 and a plurality of inwardly extending ribs 58 receive a spherical weight ball 59 in a press-fitted captivating attachment. Speed governor 10 further includes an elongated coil spring 60 having a pair of end loops 61 and 62 defined therein.

Governor 10 is assembled by pivotally attaching counterweights 30 and 50 to rotor 11 by aligning pins 34 and 35 in an angled relationship to baseplate 12 between recesses 24 and 21. After, counterweight 30 is turned or rotated to bring pivot pins 34 and 35 into a vertical alignment perpendicular to base plate 12 in which they are received within recesses 21 and 24 respectively. Thereafter, counterweight 30 is pivoted inwardly to the position shown in FIG. 3. Similarly, counterweight 50 is assembled to rotor 11 such that pivot pins 54 and 55 are received within recesses 23 and 25 of rotor 11. Thereafter, coil spring 60 is passed between supports 13 and 14 such that end loop 62 is received upon spring tab 36 of counterweight 30. Finally, counterweight 50 is rotated inwardly while coil spring 60 is stretched a sufficient distance to pass end loop 61 over spring tab 56 of counterweight 50 completing the assembly of counterweights 30 and 50 and coil spring 60 to rotor 11.

As can be seen and will be apparent to those skilled in the art from examining FIG. 1, the present invention speed governor is provided with relatively few parts and is capable of simple assembly. Among the advantages which will be apparent to those skilled in the art, is the use of insertable spherical weights 39 and 59 and their snap-fit or force-fit within hexagonal passages 37 and 57 of counterweights 30 and 50 respectively. In addition the use of a single coil spring 60 together with spaced apart supports 13 and 14 of rotor 11 provide a simple, easy to assemble structure in which a common spring is used to provide inward force to both counterweights. In addition, the use of a common spring provides a uniform spring force and endures symmetrical movement of counterweights 30 and 50 as the present speed governor is rotated.

Figure 2:
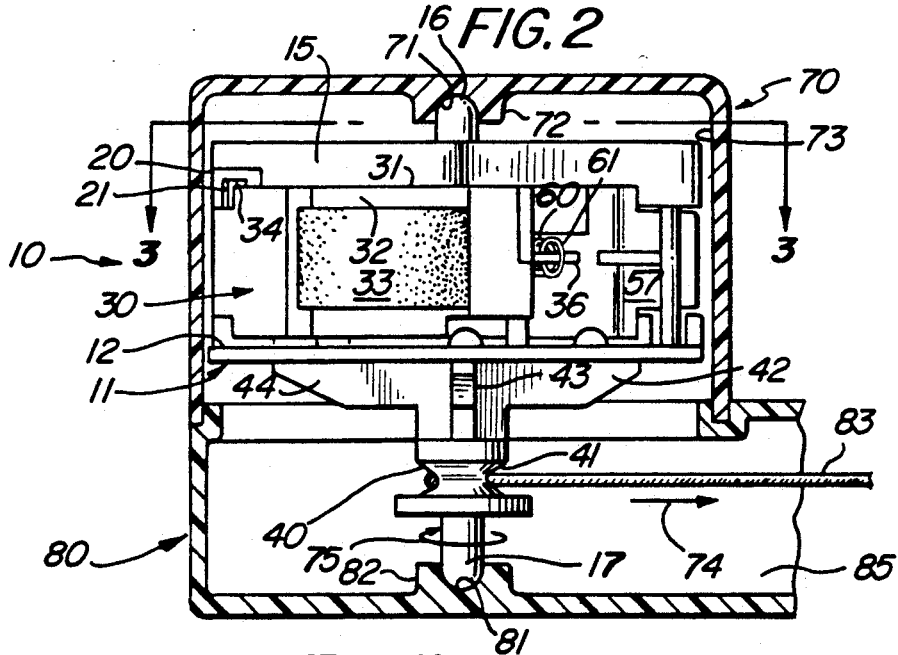
FIG. 2 sets forth a side elevation view of the present invention speed governor within a sectioned housing.

FIG. 2 sets forth a side elevation view of governor 10 assembled within a housing which, for purposes of illustration, is shown in section view but which should be understood to define a generally cylindrical closed housing which receives rotor 11 together with counterweights 30 and 50 and coil spring 60 in the above-described assembly. A rotor 11 includes a planar baseplate 12, a pair of vertical supports 13 and 14 (seen in FIG. 1) and an upper beam 15. Beam 15 terminates in an end 22 which defines a recess 23 (better seen in FIG. 3) and an end 20 which defines a recess 21. Baseplate 12 defines a pair of recesses 25 and 24 (seen in FIG. 1). Rotor 11 further defines a plurality of support ribs 42 through 45 together with a downwardly extending lower shaft 17. A pulley 40 is supported upon lower shaft 17 and defines a pulley groove 41. Upper beam 15 further defines an upwardly extending upper shaft 16. In accordance with the assembly described above, counterweights 30 and 50 are received within recesses 21 and 24 and recesses 23 and 25 in a pivotal attachment such that friction pads 33 and 53 face outwardly from rotor 11. In addition, as is also described above, coil spring 60 is coupled between spring tabs 36 and 56 of counterweights 30 and 50 respectively and passes between supports 13 and 14.

An upper housing 70, having a generally cylindrical shape defines an interior cylindrical surface 73 and a downwardly extending center boss 72. Boss 72 defines a bearing recess 71 which receives the end portion of upper shaft 16. A lower housing 80 is secured to upper housing 70 in a secure attachment and defines an upwardly extending center boss 82. Boss 82 defines a bearing recess 81 which receives the end portion of lower shaft 17. A power coupling belt 83 encircles pulley 40 within groove 41 and is used to provide rotational coupling between speed governor 10 and the remainder of the to-be-controlled drive mechanism (not shown).

Thus, the assembly of rotor 11 and counterweights 30 and 50 is rotatably supported within housing 70 and 80 by the rotational attachment provided between bearing recesses 71 and 81 and upper shaft 16 and lower shaft 17 respectively. In normal operation, belt 83 is moved as the to-be-regulated drive mechanism (not shown) causing belt 83 to move in the direction indicated by arrow 74. The movement of belt 83 in turn causes rotor 11 to rotate in the direction indicated by arrow 55.

Figure 3:
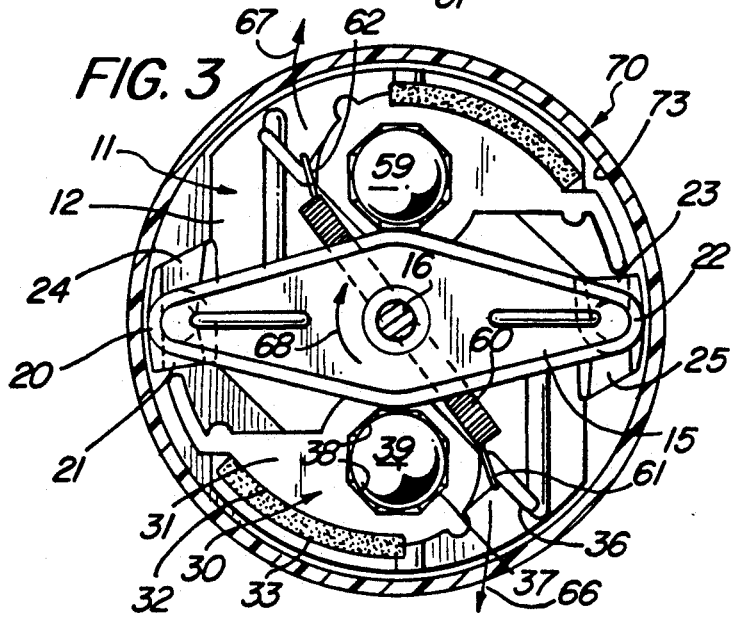
FIG. 3 sets forth a top view of the present invention speed governor taken along section lines 3—3 in FIG. 2.

FIG. 3 sets forth a top section view of governor 10 taken along section lines 3—3 in FIG. 2. Upper housing 70 defines a generally cylindrical shape having an interior cylindrical surface 73. Rotor 11 defines a generally planar baseplate 12 having a pair of upwardly extending supports 13 and 14 (seen in FIG. 1) which support an elongated upper beam 15. Upper beam 15 terminates in end portions 20 and 22 which define open-ended slotted recesses 21 and 23 respectively. Correspondingly, baseplate 12 defines open-ended slotted recesses 24 and 25 generally aligned with recesses 21 and 22 respectively of upper beam 15. In accordance with the above-described assembly, counterweights 30 and 50 are pivotally secured between upper beam 15 and baseplate 12. Specifically, counterweight 30 is received and captivated within recesses 21 and 24 while counterweight 50 is received and captivated within recesses 23 and 25. Counterweight 30 includes a curved arm 31 defining a hexagonal passage 37 having a plurality of inward extending ribs 38. A spherical ball 39 is force-fitted within passage 37 and maintained therein by ribs 38. Counterweight 30 further defines a curved surface 32 which supports a frictional pad 33. Counterweight 30 further defines a spring tab 36 which receives end loop 61 of coil spring 60.

Counterweight 50 is identical to counterweight 30 and is supported upon baseplate 12 such that curved surface 52 and frictional pad 53 thereof face outwardly toward cylindrical surface 73 of upper housing 70. By way of further similarity, counterweight 50 includes a curved arm 51 having a hexagonal passage 57 and a plurality of inwardly extending ribs 58 defined therein. A spherical ball 59 is force-fitted within hexagonal passage 57. Curved arm 51 further defines a spring tab 56 which receives end loop 62 of coiled spring 60.

In operation, as rotor 11 is rotated in the direction indicated by arrow 68, the resulting centrifugal force acting upon spherical ball 59 produces expanding forces in the directions indicated by arrows 66 and 67. As the speed of rotation in the direction of arrow 68 increases, the centrifugal force begins to overcome the drawing force of coil spring 60. In the position shown in FIG. 3, the centrifugal forces upon counterweights 30 and 50 are insufficient to pivot the counterweights outwardly and thus friction pads 33 and 53 remain out of contact with cylindrical surface 73 of housing 70. As the rotational speed increases, however, and the outward forces in the direction of arrows 66 and 67 pivot counterweights 30 and 50 outwardly, friction pads 33 and 53 are brought into contact with cylindrical surface 73 producing a resisting force which resists further increases of speed, the part of the drive system to which speed governor 10 is coupled. Conversely, once the rotational speed applied to rotor 11 is decreased, the centrifugal forces are overcome by the drawing force of spring 60 and counterweights 30 and 50 are drawn inwardly removing the frictional contact between friction pads 33 and 53 against cylindrical surface 73. This in turn removes the resisting force from the drive system.

In accordance with an important aspect of the present invention, it should be noted that the use of a common coil spring 60 coupled solely between the end portions of counterweights 30 and 50 maintains the counterweights in a generally symmetrical relationship which assures that the frictional forces applied by each friction pad against cylindrical surface 73 at higher speeds remains equal. Thus, the present invention arrangement of counterweights 30 and 50 and common coupling spring 60 maintains the symmetrical operation of speed governor 10 and greatly simplifies the assembly and fabrication thereof. By way of further advantage, it should be noted that spherical weights 39 and 59 may be replaced in different assemblies in different weight characteristics and are required by spherical weights having different densities such as by using different material or weights having a varying degree of hollow center and so on. Thus, a single governor structure may be used in a variety of speed control situations without undue assembly costs or parts inventory overhead.

Figure 4:
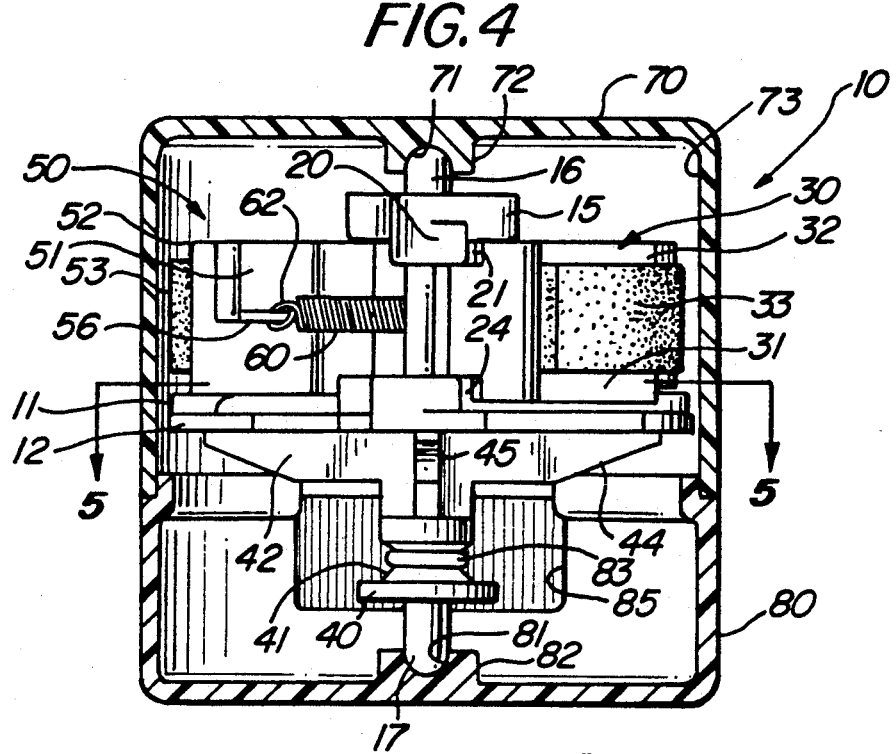
FIG. 4 sets forth a rear elevation view of the present invention speed governor within a sectioned housing.

FIG. 4 sets forth a rear view of the present invention speed governor in which upper housing 70 and lower housing 80 have been sectioned to provide a clear view of rotor 11 and counterweights 30 and 50. As set forth above, housing 70 defines an interior cylindrical surface 73 and a downwardly extending center boss 72 which in turn defines a recess 71. Housing 81 defines a center boss 82 having a recess 81 defined therein. Housings 70 and 80 are joined to enclose the assembly of rotor 11 and counterweights 30 and 50 together with spring 60. Thus, rotor 11 includes a planar baseplate 12 supporting an upper beam 15 and a plurality of support ribs 42 through 45. Rotor 11 further includes a pulley 40 having a pulley groove 41 defined therein and a lower shaft 17. Upper beam 15 defines an end 22 having a recess 21 formed therein and an upwardly extending upper shaft 16. Shafts 16 and 17 are received within recesses 71 and 81 respectively of bosses 72 and 82. Thus, rotor 11 is rotatable within housings 70 and 80. Counterweight 30 includes a curved arm 31 defining a curved surface 32 supporting a friction pad 33 thereon. By means described above, counterweight 30 is pivotally secured within recesses 21 and 24 of upper beam 15 and baseplate 12 respectively. Similarly, counterweight 50 includes a curved arm 51 having a curved surface 52 defined thereon which supports a friction pad 53. While not seen in FIG. 4, it should be apparent from the figures set forth above that counterweight 50 is pivotally secured between upper beam 15 and baseplate 12 in the same manner as counterweight 30. As is also described above, a coil spring 60 is commonly coupled between counterweights 30 and 50. A power coupling belt 83 extends through passage 85 of lower housing 80 and is coupled to the remainder of the to-be-speed controlled drive mechanism (not shown) with which the present invention speed governor is used.

Figure 5:
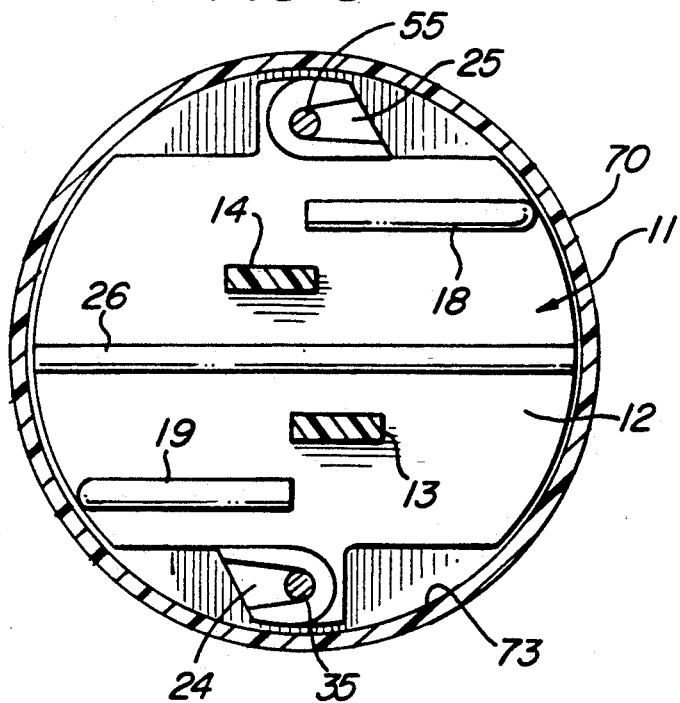
FIG. 5 sets forth a section view taken along section lines 5—5 in FIG. 4.

FIG. 5 sets forth a section view of the present invention speed governor taken along section lines 5—5 in FIG. 4. Housing 70 is generally cylindrical and defines an interior cylindrical surface 73. Rotor 11 includes a generally planar baseplate 12 defining a pair of open-ended slot recesses 24 and 25. Recesses 24 and 25 receive pivot pins 35 and 55 of counterweights 30 and 50 respectively to form the above-described pivotal attachment. Rotor 11 further includes a pair of upwardly extending spaced apart supports 13 and 14 which, as is better seen in FIG. 1, support upper beam 15 in a generally parallel spaced arrangement with respect to baseplate 12. It should be noted that, in accordance with an important aspect of the present invention, the spacing between supports 13 and 14 leaves the center portion of baseplate 12 clear to permit the use of coil spring 60 in a straight through coupling arrangement between counterweights 30 and 50 as is better seen in FIG. 3. Baseplate 12 further defines a plurality of upwardly extending ribs 18, 19 and 26 which provide bearing surfaces upon which counterweights 30 and 50 may move in response to centrifugal and spring forces with a minimum of friction or interference thus retaining their reliable speed control characteristics.

What has been shown is a simple, effective and easy to assemble speed governor which uses relatively few parts and which provides a single return spring commonly coupled between a pair of pivotally supported counterweight arms. The counterweight arms support removable weights which are press-fitted into hexagonal passages within the counterweight arms.

While particular embodiments of the invention have been shown and described it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A rotational speed governor comprising:
   a housing defining an interior cavity having a cylindrical interior surface;
   a rotor defining an axis of rotation rotatably supported within said interior cavity;
   a pair of counterweights each having a first end pivotally secured to said rotor, a second end and an outwardly facing friction surface therebetween, said pair of counterweights each defining a weight receptor proximate said second end thereof and a weight secured within said weight receptor; and
   a spring defining an elongation axis having first and second ends, said spring being coupled to and extending between said second ends of said pair of counterweights such that said elongation axis of said spring extends through the axis of rotation of said rotor.

2. A rotational speed governor as set forth in claim 1 wherein said weight receptors define passages and wherein said weights are force-fitted therein.

3. A rotational speed governor as set forth in claim 2 wherein said passages are faceted and said weights define generally circular cross sections.

4. A rotational speed governor as set forth in claim 3 wherein said passages are generally symmetrically faceted and said weights are generally spherical.

5. A rotational speed governor as set forth in claim 4 wherein said passages each define a plurality of transverse ribs.

6. A rotational speed governor as set forth in claim 5 wherein said spring is a coil spring.

7. A rotational speed governor as set forth in claim 6 wherein said coil spring defines loop portions at said first and second ends thereof and wherein said second ends of said counterweights define extending tabs for receiving said loop portions.

* * * * *